United States Patent [19]
Yokota

[11] Patent Number: 5,754,521
[45] Date of Patent: May 19, 1998

[54] RECORDING MEDIUM HAVING A FIRST MANAGEMENT AREA FOR MANAGING A FIRST ATTRIBUTE AND A SECOND MANAGEMENT AREA FOR MANAGING A SECOND ATTRIBUTE OF A PROGRAM RECORDED IN A RECORDING AREA

[75] Inventor: Teppei Yokota, Chiba, Japan

[73] Assignee: Sony Corporation, Japan

[21] Appl. No.: 572,528

[22] Filed: Dec. 14, 1995

[30] Foreign Application Priority Data

Dec. 22, 1994 [JP] Japan .................... 6-320107

[51] Int. Cl.$^6$ .................................................. G11B 7/24
[52] U.S. Cl. .................. 369/275.3; 369/58; 369/32; 369/48
[58] Field of Search ................. 369/275.3, 58, 369/32, 48, 53, 54, 60, 47, 49, 124, 275.1; 360/39, 33.1

[56] References Cited

U.S. PATENT DOCUMENTS

| | | | |
|---|---|---|---|
| 5,475,668 | 12/1995 | Azumatani et al. | 369/58 |
| 5,596,564 | 1/1997 | Fukushima et al. | 369/275.3 |

FOREIGN PATENT DOCUMENTS

| | | |
|---|---|---|
| 0165320 A1 | 12/1985 | European Pat. Off. . |
| 0346979 A2 | 12/1989 | European Pat. Off. . |
| 0464811 A2 | 1/1992 | European Pat. Off. . |
| 0507397 A2 | 10/1992 | European Pat. Off. . |
| 0571123 A2 | 11/1993 | European Pat. Off. . |
| 0597339 A1 | 5/1994 | European Pat. Off. . |
| 0614188 A2 | 9/1994 | European Pat. Off. . |
| 6-12837 | 1/1994 | Japan . |
| 6-27982 | 2/1994 | Japan . |

OTHER PUBLICATIONS

Patent Abstracts of Japan, vol. 017, No. 095 (P-1493), JP 04 291077 A (Casio Comut CO LTD), Published Oct. 15, 1992.

*Primary Examiner*—Ali Neyzari
*Attorney, Agent, or Firm*—Limbach & Limbach L.L.P.

[57] ABSTRACT

A disc-shaped recording medium which includes a first management area for managing at least the address information of the program recorded in the program area of the recording medium, and a second management area which is separate from the first management area and in which is recorded the attribute information specifying the attributes of each program and/or the disc-shaped recording medium, and a reproducing apparatus in which, when reproducing the disc-shaped recording medium, the first management area is first reproduced, and the second management area is accessed based upon the address recorded in the first management area for reproducing and displaying the attribute information recorded in the second management area.

6 Claims, 15 Drawing Sheets

|  | P | Q | R | S | T | U | V | W |
|---|---|---|---|---|---|---|---|---|
| FRAME 01 | | | | S0 | | | | |
| 02 | | | | SI | | | | |
| 03 | P01 | Q01 | R01 | S01 | T01 | U01 | V01 | W01 |
| 04 | P02 | Q02 | R02 | S02 | T02 | U02 | V02 | W02 |
| . | . | . | . | . | . | . | . | . |
| . | . | . | . | . | . | . | . | . |
| . | . | . | . | . | . | . | . | . |
| 95 | P93 | Q93 | R93 | S93 | T93 | U93 | V93 | W93 |
| 96 | P94 | Q94 | R94 | S94 | T94 | U94 | V94 | W94 |
| 97 | P95 | Q95 | R95 | S95 | T95 | U95 | V95 | W95 |
| 98 | P96 | Q96 | R96 | S96 | T96 | U96 | V96 | W96 |

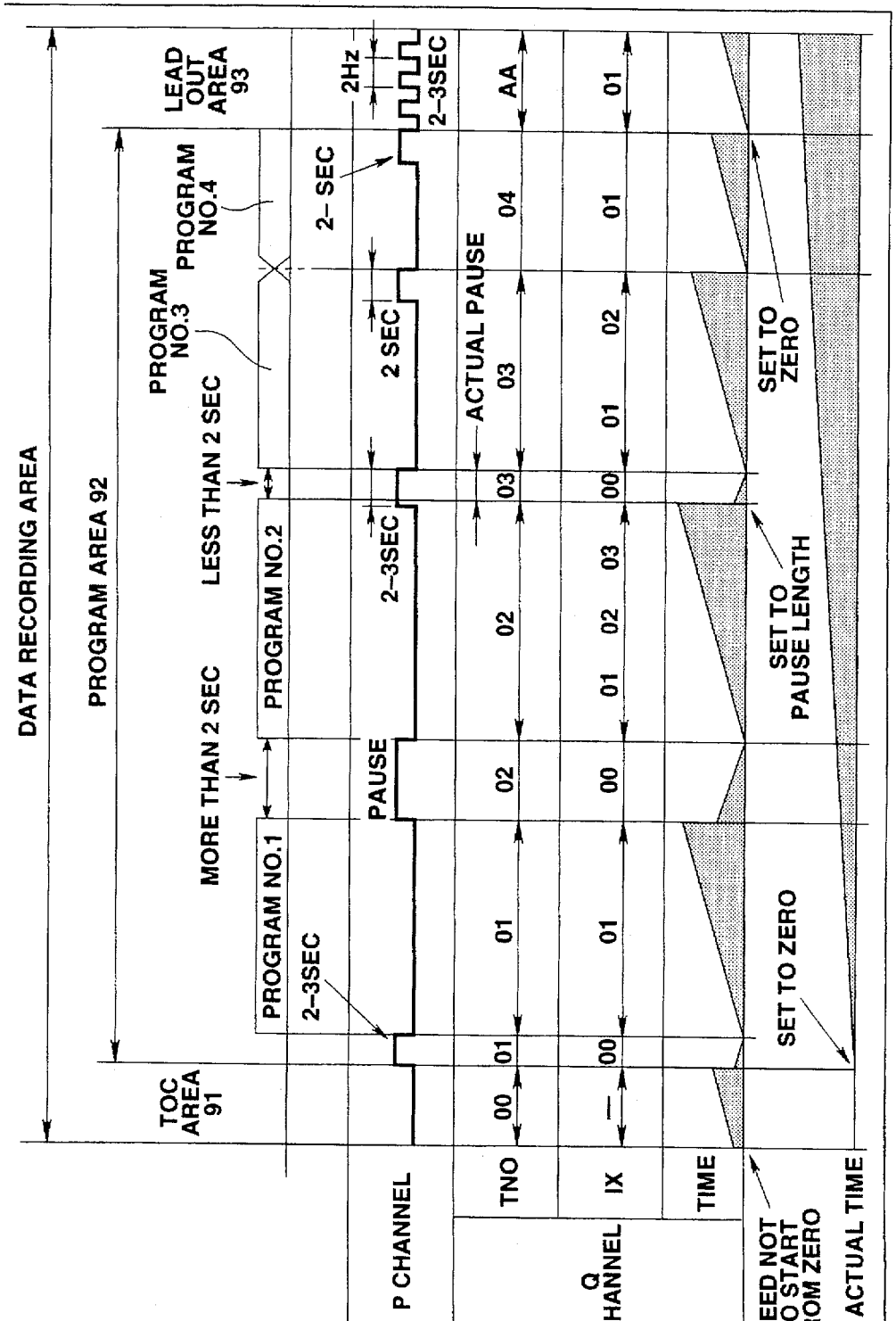

| 51 | 52 | 53 | 54 | 55 | 56 | 57 | 58 | 59 |
|---|---|---|---|---|---|---|---|---|
| TRACK NUMBER | INDEX | ELAPSED TIME MINUTE | ELAPSED TIME SECOND | ELAPSED TIME FRAME NUMBER | 0 | ABSOLUTE TIME MINUTE | ABSOLUTE TIME SECOND | ABSOLUTE TIME FRAME NUMBER |

| CONTROL/ ADDRESS C/A | PROGRAM NUMBER TR | INDEX IX | ELAPSED TIME MINUTE MIN | ELAPSED TIME SECOND SEC | ELAPSED TIME FRAME NUMBER FRM | ZER 0 | ABSOLUTE TIME MINUTE PMIN | ABSOLUTE TIME SECOND PSEC | ABSOLUTE TIME FRAME NUMBER PFRM |
|---|---|---|---|---|---|---|---|---|---|
| 0/1 | 00 | A0 | 00 | 00 | 00 | 00 | 01 | 00 | 00 |
| 0/1 | 00 | A1 | 00 | 00 | 01 | 00 | 07 | 00 | 00 |
| 0/1 | 00 | A2 | 00 | 00 | 02 | 00 | 31 | 06 | 50 |
| 0/1 | 00 | 01 | 00 | 00 | 03 | 00 | 00 | 02 | 00 |
| 0/1 | 00 | 02 | 00 | 00 | 04 | 00 | 07 | 02 | 68 |
| 0/1 | 00 | 03 | 00 | 00 | 05 | 00 | 11 | 24 | 37 |
| 0/1 | 00 | 04 | 00 | 00 | 06 | 00 | 15 | 41 | 03 |
| 0/1 | 00 | 05 | 00 | 00 | 07 | 00 | 19 | 58 | 53 |
| 0/1 | 00 | 06 | 00 | 00 | 08 | 00 | 22 | 37 | 61 |
| 0/1 | 00 | 07 | 00 | 00 | 09 | 00 | 27 | 02 | 15 |
| 0/5 | 00 | B0 | 33 | 36 | 50 | 02 | 64 | 13 | 02 |
| 0/5 | 00 | C0 | 00 | 00 | 00 | 00 | 97 | 22 | 74 |

FIG.12

| CONTROL/ ADDRESS C/A | PROGRAM NUMBER TR | INDEX NUMBER IX ATTRIBUTE NUMBER | ELAPSED TIME MINUTE MIN CHARACTER DATA | ELAPSED TIME SECOND SEC CHARACTER DATA | ELAPSED TIME FRAME NUMBER FRM CHARACTER DATA | 0 CHARACTER DATA | ABSOLUTE TIME MINUTE PMIN CHARACTER DATA | ABSOLUTE TIME SECOND PSEC CHARACTER DATA | ABSOLUTE TIME FRAME NUMBER PFRM CHARACTER DATA |
|---|---|---|---|---|---|---|---|---|---|
| 4/1 | 00 | A0 | 00 | 00 | 04 | 00 | 08 | 00 | 00 |
| 4/1 | 00 | A1 | 00 | 00 | 05 | 00 | 08 | 00 | 00 |
| 4/1 | 00 | A2 | 00 | 00 | 06 | 00 | 64 | 13 | 02 |
| 4/1 | 00 | 08 | 00 | 00 | 07 | 00 | 33 | 38 | 50 |
| 4/6 | 01 | 00 | T | E | S | T | D | – | S |
| 4/6 | 129 | 01 | C | N | O | 1 | 00 | 00 | 00 |
| 4/6 | 02 | 00 | t | e | s | t | d | – | s |
| 4/6 | 130 | 01 | c | n | o | 2 | 00 | 00 | 00 |
| 4/6 | 131 | 00 | N | 0 | 3 | 00 | 00 | 00 | 00 |
| 4/6 | 100 | 00 | D | – | S | C | T | – | t |
| 4/6 | 228 | 01 | a | e | 00 | 00 | 00 | 00 | 00 |
| 4/6 | 101 | 00 | D | – | S | C | N | 0 | – |
| 4/6 | 229 | 01 | 2 | 3 | 4 | 5 | 6 | 7 | 1 |
| 4/6 | 230 | 00 | J | A | Z | N | 00 | 00 | 00 |

FIG.13

| PROGRAM NUMBER | ATTRIBUTE | CHAR-ACTER DATA | CHAR-ACTER DATA | CHAR-ACTER DATA | CHAR-ACTER DATA | CHAR-ACTER DATA | CHAR-ACTER DATA | CHAR-ACTER DATA | CHAR-ACTER DATA |
|---|---|---|---|---|---|---|---|---|---|
| 11 | 12 | 13 | 13 | 13 | 13 | 13 | 13 | 13 | 13 |

| PROGRAM NUMBER TR | CLASSIFICATION OF ATTRIBUTES OF CHARACTER STRING |
|---|---|
| 100 | DISC TITLE |
| 101 | DISC ID |
| 102 | GENRE |
| 103 | NAME OF PLAYER |
| 104 | MESSAGES |
| 105 | MAX. LEVEL |
| 106 | MIN. LEVEL |
| 107 | MEAN LEVEL |
| 108 | MODE LEVEL |
| 0<br>109~126 | RESERVE |

FIG.15

RECORDING MEDIUM HAVING A FIRST MANAGEMENT AREA FOR MANAGING A FIRST ATTRIBUTE AND A SECOND MANAGEMENT AREA FOR MANAGING A SECOND ATTRIBUTE OF A PROGRAM RECORDED IN A RECORDING AREA

BACKGROUND OF THE INVENTION

This invention relates to a disc-shaped recording medium having at least one program area and a management information recording area having recorded therein the program-based elapsed time and the total absolute time for the program. The invention also relates to a method and apparatus for reproducing the disc-shaped recording medium.

The format for recording data on this optical disc includes a table-of-contents (TOC) area 91, as a program management area, a program area 92, and a lead-out area 93, as a program terminating area, looking from the inner towards the outer rim of the optical disc, as shown in FIG. 1.

In an optical disc for audio, having the audio information recorded thereon, audio data is recorded in the program area 92, while the play time for each program recorded on the optical disc, the number of programs and the total play time are managed by the TOC area 91.

When the read out of the audio data from the program area 92 by the disc reproducing apparatus comes to a close and an optical pickup reaches the lead-out area 93, the disc reproducing apparatus terminates the reproducing operation of the optical disc for audio.

Referring to FIG. 2, the disc reproducing apparatus reads out the audio data of the optical disc for audio 61 by an optical pickup 62 and processes the audio data by a digital signal processing circuit 66. The disc reproducing apparatus outputs the resulting playback data at a digital signal output terminal 75 or analog signal output terminal right channel R and left channel L. The focusing and tracking servo signals, reproduced from the disc reproducing apparatus, are transmitted to a focusing servo circuit 70 and a tracking and thread servo circuit 71, respectively, while thread servo error signals are transmitted only to the tracking and thread servo circuit 71.

With the above disc reproducing apparatus, playback signals are read out from the optical disc for audio 61 by the pickup 62 and transmitted to an analog wave-forming circuit 64. The analog wave-forming circuit 64 waves-shapes the playback signals into bi-level signals which are sent to a synchronization detection circuit 65 and a clock generating circuit 67.

The synchronization detection circuit 65 extracts frame synchronization signals from the bi-level signals, based upon clocks sent from the clock generating circuit 67, and sends the frame synchronization signal and the clocks to the digital signal processing circuit 66. The bi-level signals, from which the frame synchronization pattern has been detected, are transmitted to the digital signal processing circuit 66 which generates playback clocks from the playback signals based upon reference clocks from a quartz oscillator 69 and clocks from the clock generating circuit 67. The clocks from the clock generating circuit 67 are sent to the synchronization detection circuit 65 and to the digital signal processing circuit 66, while also being sent to a rotary servo circuit 72.

The digital signal processing circuit 66 decodes the audio signals, from which frame synchronization signals have been detected, based upon the clocks from the clock generating circuit 67 and the reference clocks from a quartz oscillator 69, and sends the decoded digital signals to a sub-coding detection circuit 68, a D/A converting circuit 73 and to a digital signal output terminal 75.

The D/A converting circuit 73 converts the digital signal into analog signals which are sent to an audio amplifier 74. The audio amplifier 74 amplifies analog audio signals from the D/A converter 73 and outputs the amplified signals at the digital signal output terminal 75 or analog signal output terminal right channel R and left channel L.

The sub-coding detection circuit 68 detects data of P- and Q-channels, as later explained, from digital signals from the digital signal processing circuit 66, and sends data of the respective channels to a controller 76. The controller 76 controls the tracking and thread servo circuit 71 based upon data of the P- and Q-channels, which are decoded sub-code signals.

The focusing servo circuit 70 generates focusing operating driving signals, based upon focusing servo error signals from the pickup 62, and sends the focusing operating driving signals to the pickup 62 for vertically driving an objective lens.

The rotation servo circuit 72 generates rotation operating driving signals, based upon reference clocks from the clock generating circuit 67 and the reference clocks from the quartz oscillator 69 and sends the rotation operating driving signal to a spindle motor 63 for controlling the rotation of the spindle motor 63.

The tracking and thread servo circuit 71 generates tracking control driving signals based upon tracing servo error signals from the pickup 62 and sends the tracking control drive signals to the pickup 62 for controlling the tracking operation of the pickup 62.

Program position control signals are generated by the control circuit 76 based upon the sub-code data from the P- and Q-channels. The program position control signals are sent to the pickup 62. The program position control operation for the pickup 62 during the programming mode, as later explained, is carried out based upon the program position control signals.

The programming mode is one of several playback modes of reproducing the optical disc for audio data. These modes include a mode of playing plural audio data recorded in the program area 92 in a re-arrayed playback sequence.

During the programming mode, the controlling circuit 76 manages control so that program position control operating signals are generated based upon the sub-code data of the P- and Q-channels sent from the sub-code detection circuit 68, while driving the tracking and thread servo circuit 71 based upon the program position control operating signal and accessing the programs in the program area in a pre-set sequence for reading out audio data.

The P- and Q-channel data are hereinafter explained. The signals recorded on the optical disc for audio are sampled at a sampling frequency of 44.1 kHz by the disc reproducing device and the sampled data are collected into frames of six samples each.

As seen in FIG. 3, the format of the signals collected into frames includes, for each frame 85, a 24-bit synchronization pattern data area 81, a 14-bit sub-coding area 82, a program data area 83, made up of 16 14-bit program data D0 to D15, a parity data area 84, made up of 4 14-bit parity data P0 to P3, another program data area 83 and another parity data area 84. For linking the respective areas or data portions, 3-bit linking data 80 are provided for the respective areas or data portions. Thus, each frame 85 is made up of 588 bits.

FIG. 4 shows 98 of the above frames 85, in which the respective areas and data portions are linked and re-arrayed to form a block 89. Each block is made up of a frame synchronization pattern section 86, a sub-coding section 87 and a data-parity section 88.

The sub-coding data, inclusive of the P- and Q-channel data sent from the sub-coding detection circuit 68 of FIG. 2, are recorded in the sub-coding section 87 of FIG. 4. The sub-coding section 87 is constructed of 98 frames, from frame 01 to frame 98, to make up one block or a sub-coding frame, as shown in FIG. 5.

The frames 01 and 02 constitute block synchronization patterns and represent out-of-rule patterns S0, S1 of the eight-to-fourteen modulation (EFM). The sub-coding detection circuit 68 of FIG. 2 detects the synchronization patterns as the sub-coding section 87 for one block. The respective bits of the frames of frame 01 to the frame 98 constitute channels from channel P to channel W. For example, the channel P is made up of portions of S0 and S1 and P01 to P96.

Up to now, 6-channel data, from channel R to channel W, are used for special purposes, such as still pictures or displaying song texts for karaoke. Data of the P- and Q-channels are used for controlling the program position control operation, that is the accessing operation, for the optical pickup.

The P-channel is exclusively used for recording a signal "0" in a TOC area 91, signals "1" and "0" between audio data and audio data and otherwise in a program area 92, and a signal repeating "0" and "1" at a pre-set period in a lead-out area 93, as shown in FIG. 7b. The P-channel information is employed for locating a program.

The Q channel information is used as the addressing information for the pickup 62 of FIG. 2 to perform the above accessing operation. As illustrated in FIG. 6, each block or sub-coding frame of the Q-channel is made up of a synchronization bit block 111, a control bit block 112, an address bit block 113, a data bit block 114 and a cyclic redundancy code (CRC) bit block 115.

The synchronization bit block 111 has two bits as a portion of the synchronization pattern. The control bit block 112 has four bits for recording data for specifying the number of audio channels, emphasis or digital data discrimination. The 4-bit control bit data in the control bit block 112, that is the control bit data, will now be explained with reference to FIG. 8.

A control bit data 121 specifies 2-channel audio without pre-emphasis, while a control bit data 122 specifies 4-channel audio without pre-emphasis. A control bit data 123 specifies 2-channel audio with pre-emphasis, while a control bit data 124 specifies 4-channel audio with pre-emphasis. The control bit data 125 specifies a data program, other than audio data, as in a data optical disc or a CD-ROM. The address bit block 113 is a four-bit data for recording a control signal specifying the format of data in the data bit block 114. The data bit block 114 is a 72 bit data, as shown in FIG. 9. If the address bit is "0001", the data bit block 114 is made up of a track number section 51, an index section 52, an elapsed time minute component section 53, an elapsed time second component section 54, an elapsed time frame number section 55, a 0-section 56, an absolute time minute component section 57, an elapsed time second component section 58 and an absolute time frame number section 59. Each section is an 8-bit data. It is noted that one frame of the frame number recorded in the elapsed time frame number section 55 and in the absolute time frame number section 59 specifies the above-mentioned sub-coding frame.

The program number section 51 of FIG. 9 is represented with two digits in the binary coded decimal (BCD) notation. For example, "00" specifies the lead-in area or TOC area, while "01" to "99" specify the program numbers and "AA" specifies the data read-out end position (outer most track) or the lead-out area.

FIG. 7C shows an example of a Q-channel of an optical disc having four programs recorded therein. In the program number section 51, there are recorded data "00", data "01" and data "AA" in association with the TOC area, program number 1 and in the outer most track, respectively, as shown in FIG. 7C. The data specifying the program number is incremented from "01" in association with the program numbers.

The index section 52 of FIG. 9 is represented in two-digit BCD notation. For example, "00" specifies a transient stop or pause while "01" to "99" specify subdivided portions of a program, that is sub-programs. The program number 2 is divided into three portions so that "01–03" is recorded in an index IX, while the program number 3 is divided into two portions so that "01–02" is recorded in the index IX, as shown in FIG. 7D.

The elapsed time minute component section 53, elapsed time second component section 54 and the elapsed time frame number section 55 specify the elapsed time in a program with each two digits, totalling 6 digits, as shown in FIG. 9. The elapsed time frame number section 55 is represented by from "00" to "74". The elapsed time frame number is decremented in the P-channel section between programs, and starts with zero at each program start position. The 0 section 56 is stuffed with "0".

FIG. 7e specifies the recording time (play time) for each music track number. The absolute time minute component section 57, elapsed time second component section 58 and the absolute time frame number section 59, shown in FIG. 9, are specified with each two digits, totalling six digits, in BCD notation. If, in the TOC area 91 of FIG. 1, the index section 52 is A0 or A1, the absolute time component section 57 specifies the first program number or the last program number, respectively.

The absolute time second component section 58 and the absolute time frame component section 59 are "0" no matter whether the index section 52 is A0 or A1. If the index section 52 is A2, the absolute time at which begins the lead-out area 93 in FIG. 1 is recorded in the absolute time minute component section 57, elapsed time second component section 58 and the absolute time frame number section 59.

In addition, in the program area 92 of FIG. 1, the absolute time is recorded in the absolute time minute component section 57, elapsed time second component section 58 and the absolute time frame number section 59 after the pause start position of the first program for each oncoming "0".

Finally, the CRC bit section 115 of FIG. 6 is the recorded data for error detection by cyclic redundancy code.

For the programming mode, the information employing the above-described Q-channel data is detected by the subcoding detection circuit 68 of the disc reproducing apparatus and decoded, as shown in FIG. 2. The controller 76 then controls the tracking and thread servo circuit 71 based upon the decoded signals for performing the accessing operation by the pickup 62.

Since the time information concerning the number and contents of the programs is recorded in the information employing the Q-channel data, this information is displayed in a display device, such as liquid crystal display (LCD), so that the elapsed play time, absolute time from the outset or the program number in the audio optical disc of the program being played can be identified visually.

Recently, a disc exchange type disc reproducing apparatus, in which a desired one of plural audio optical discs housed therein is reproduced, has become popular. It is desirable to discriminate the optical disc for audio reproduction which is being reproduced by the disc-exchange type disc reproducing apparatus. However, since the character information, such as the title information proper to the disc or the title information proper to the program, is not recorded in the above-described management information, the title of the optical audio disc being reproduced or the title of the program being reproduced cannot be displayed on the display unit.

Heretofore, the program title can be recorded on the audio optical disc by recording the title of each program in channel R to channel W of the sub-code information or by using a portion of the main signals for recording as CD-ROM data. However, it is a painstaking operation to enter each program title data.

In the case of the disc reproducing apparatus for reproducing the audio optical discs, data recorded using the CD-ROM format can be decoded only by effecting decoding proper to the CD-ROM format and cannot be taken out unless decoding is done using a specified integrated circuit.

The result is that the disc reproducing apparatus for reproducing the audio optical disc becomes costly. The character information required is only on the order of 2 Kbytes thus increasing waste.

SUMMARY OF THE INVENTION

It is therefore an object of the present invention to provide a recording medium capable of recording character information that can be taken out without using specified decoding means and a disc reproducing method and apparatus for reproducing the disc-shaped recording medium.

In one aspect, the present invention provides a disc-shaped recording medium having a program area in which is recorded at least one program, a first management area in which are recorded an absolute address information of each program recorded in the program area and a first management information inclusive of absolute address information of all of the programs recorded in the program area, and a second management area which is separate from the first management area and in which is recorded second management information inclusive of attribute information specifying the attributes of each program or the disc-shaped recording medium.

Preferably, the first management area, program area and the second management area are provided in this order looking from the inner rim towards the outer rim of the disc-shaped recording medium, and the address information specifying the recording position of the second management area is recorded in the first management area.

Preferably, the data recorded in the program area is audio data and the attribute information managed by the second management area is at least one of the title information of the disc-shaped recording medium, the information on the player, program-based title information, the information on program sorts, the identification code number of the disc-shaped recording medium, and the message information concerning the program.

Preferably, the data recorded in the program area is audio data and wherein the attribute information managed by the second management area is at least one of the minimum level, the maximum level, the average level and the maximum frequency level of the program.

In another aspect, the present invention provides a method for reproducing a disc having a first management area, a program area in which is recorded a program managed by the first management area, and a second management area in which is recorded a second management information including an attribute information specifying the program recorded in the program area. The first management area has recorded therein an absolute address information for each program recorded in the program area, an absolute address information for all the programs recorded in the program area, and an address information specifying the second management area. The method includes the steps of accessing the first management area for reading out the first management information recorded in the first management area, detecting the start position of the second management area based upon a time information specifying the second management area in the first management information readout in the first management information readout step, and accessing the start position of the second management area based upon the result of detection by the detection step for reading out the second management information.

Preferably, the method includes the steps of accessing the program area of the disc-shaped recording medium for reading out the program, and displaying the first management information read out by the first management information readout step and the second management information read out by the second management information readout step during reproduction of the program read out by the program readout step.

In still another aspect, the present invention provides a reproducing apparatus for carrying out the above-defined reproducing steps.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 5 illustrated a subcoding section 87 of FIG. 4 in a transverse position.

FIG. 7-a schematically shows an optical disc on a recording medium having four programs recorded thereon.

FIG. 7-b schematically shows a P-channel of an optical disc on a recording medium having four programs recorded thereon.

FIG. 7-c schematically shows a track number section of a Q-channel of an optical disc on a recording medium having four programs recorded thereon.

FIG. 7-d schematically shows an index section of a Q-channel of an optical disc on a recording medium having four programs recorded thereon.

FIG. 7-e schematically shows elapsed time of a Q-channel of an optical disc on a recording medium having four programs recorded thereon.

FIG. 7-f schematically shows absolute time of a Q-channel of an optical disc on a recording medium having four programs recorded thereon.

FIG. 9 illustrates the Q-channel data of the conventional TOC.

FIG. 12 shows an example of data in a first TOC area of an optical disc for audio reproduction.

FIG. 13 shows an example of data in a second TOC area of an optical disc for audio reproduction.

FIG. 14 illustrates a format of data bits having character data of the second TOC area of the optical disc for audio.

FIG. 15 illustrates the second management information of the optical disc for audio reproduction.

DETAILED DESCRIPTION OF THE PREFERRED EMBODIMENTS

Figure 10:
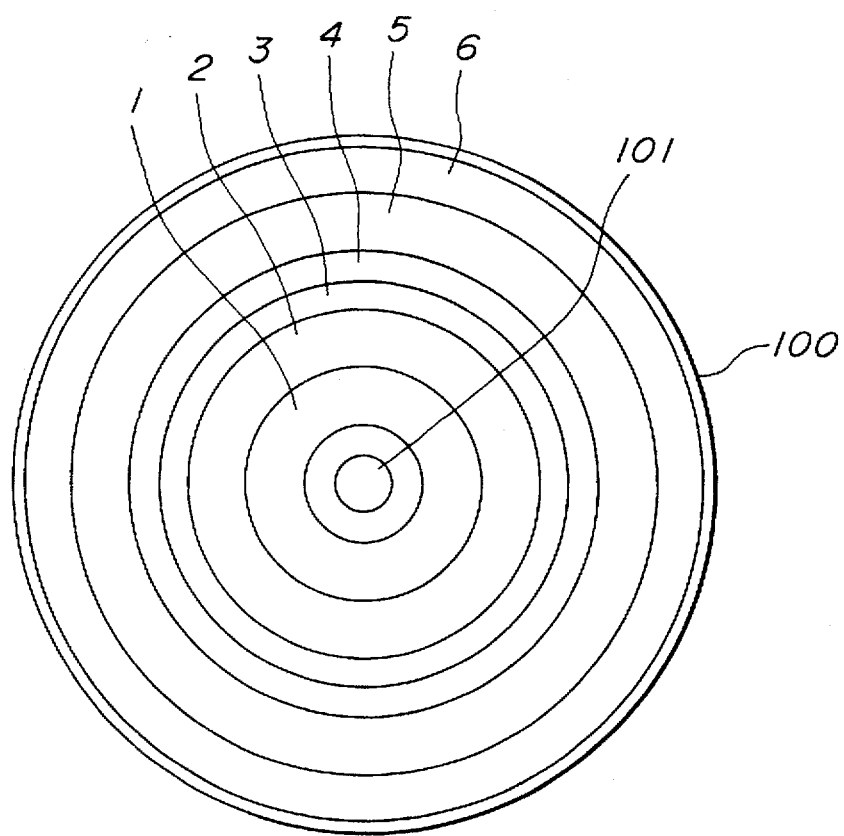
FIG. 10 schematically shows an optical disc for audio as a disc-shaped recording medium according to the present invention.
Figure 11:
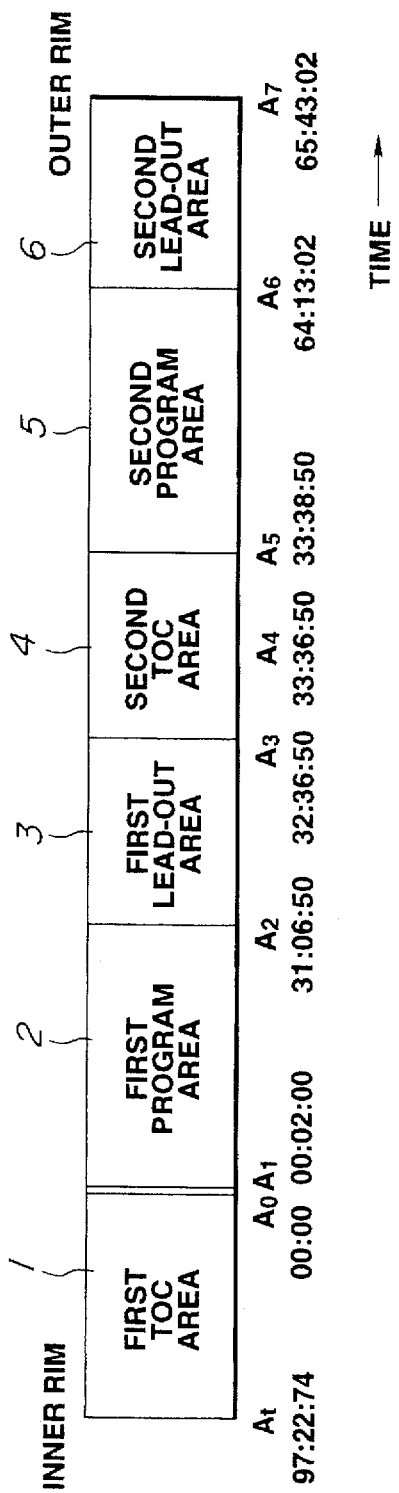
FIG. 11 illustrates a data area recorded on an optical disc for audio.

Referring to the drawings, particularly FIGS. 10 and 11, an optical disc having audio data recorded thereon, as a disc-shaped recording medium according to the present invention, will be explained in detail.

An optical disc 100 has a center opening 101, as shown in FIG. 10. Also the optical disc 100 has a first table-of-contents (TOC) area 1, as a first management area of from time address $A_r$ to time address $A_0$, a first program area 2 of from time address $A_1$, to time address $A_2$, a first lead-out area 3, that is a first program end area of from time address $A_2$ to time address $A_3$, a second (TOC) area 4, as a second management area of from time address $A_3$ to time address $A_5$, a second program area 5 of from time address $A_5$ to time address $A_6$, and a second lead-out area 6 of from time address $A_6$ to time address $A_7$, as shown in FIGS. 10 and 11. In FIG. 11, the time address $A_0$ is the point of origin.

The first TOC area 1 has recorded therein a first management information of audio data recorded in the first program area 2, such as play time of each audio data, absolute time from the position of the first audio data, and a time information specifying the second TOC area 4. The first program area 2 has plural audio data and is provided as far as the beginning point of the first lead-out area 3.

The second TOC area 4 has recorded therein an information concerning the attributes of the plural audio data in the first program area 2, as the second management information, such as the title/identification codes of the optical disc 100, the title name information of each program, the player name information of each program, the genre information of each program or the message information concerning the above titles or audio data.

Figure 6:
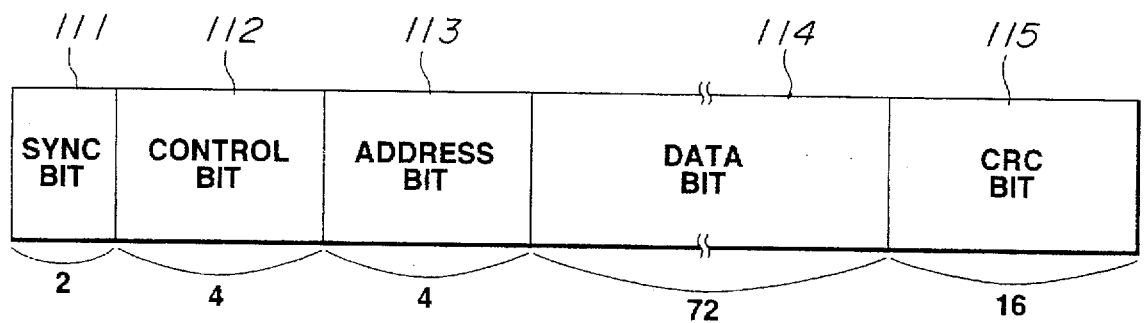
FIG. 6 illustrates the construction of data of the Q-channel.
Figure 8:
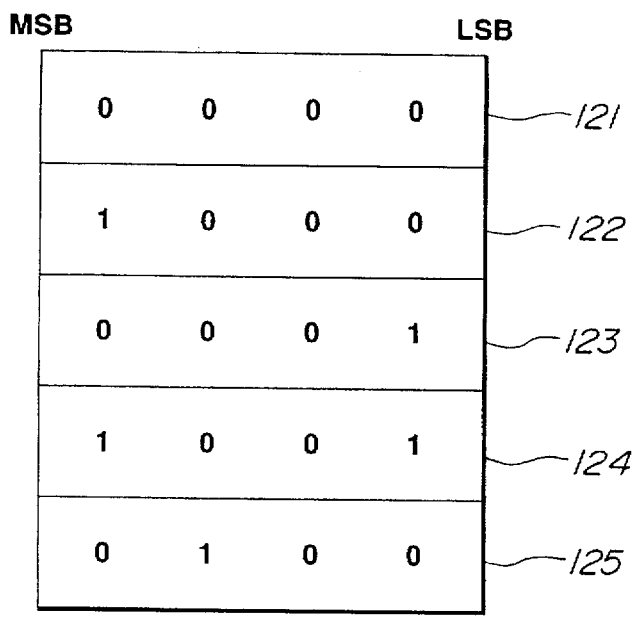
FIG. 8 illustrates control bit data of the Q-channel data.

The second TOC area 4 also manages the program attribute information, such as a maximum level, an average level, a maximum frequency level and a minimum sound pressure level of the audio data, as other second management information. The second management information is managed by the Q-channel of the second TOC area 4. The construction of the Q-channel data per block is made up of a synchronization bit block 111, a control bit bock 112, an address bit block 113, a data bit block 114 and a CRC bit block 115, as previously explained and shown in FIG. 6. The above block is also referred to as a subcoding frame, as also explained previously.

If the address bit data of the address bit block 113 is "1", that is "0001" in binary notation, the data bit block 114 is made up of a program number section 51, an index section 52, an elapsed time minute component section 53, an elapsed time second component section 54, an elapsed time frame number section 55, a 0-section 56, an absolute time minute component section 57, an absolute time second component section 58 and an absolute time frame number section 59, as previously described and shown in FIG. 9. The first TOC area 1, first program area 2 and the first lead-out area 3 are recorded in this format.

It should be noted that one frame of the frame number recorded in the elapsed time frame number section 55 and in the absolute time frame number section 59 specifies the above subcoding frame.

Each second is divided into e.g., 75 sub-coding frames.

Figure 3:
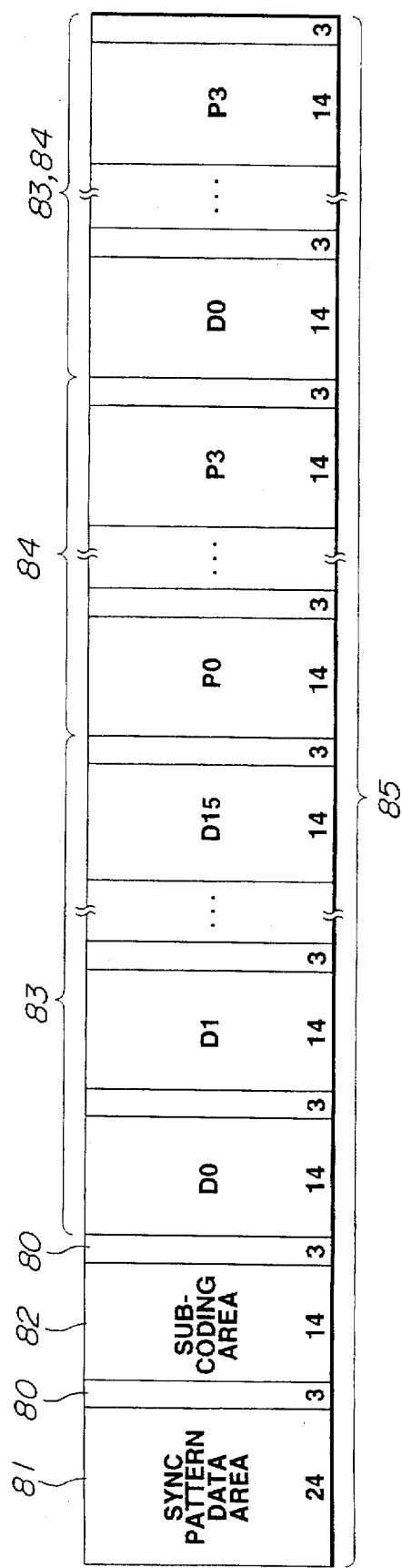
FIG. 3 illustrates data of the sub-code information for one frame.

FIG. 3 shows, on the frame basis, an example of data of the Q-channel of the TOC area 1. In FIG. 12, only the index number IX is represented in hexadecimal notation and all other numerical figures are represented in decimal notation.

If the address bit data is "1", that is, "0001" in binary notation, and the index number IX is "A0", it specifies that the first program number is written in the absolute time minute component PMIN, whereas, if the index number IX is "A1", it specifies that the last program number is written in the absolute time minute component PMIN. On the other hand, if the index number IX is "A2", the absolute time of beginning of the first lead-out area, that is the time indicating the time address $A_2$ of FIG. 11, is written in the absolute time minute component PMIN.

Thus it is seen that, with the optical disc for audio having the contents of the TOC of FIG. 12, the first to seventh programs are audio programs and the performance comes to a close at a 31 minutes:06 seconds:50 frames after the time address $A_0$. That is, this position corresponds to the time address $A_2$ in FIG. 11.

On the other hand, the index numbers IX from "01" to "07" correspond to the first to the seventh programs, and the absolute time of each program is recorded in PMIN, PSEC and PFRAME. The absolute time specifies the minute, the second and the frame from the time address $A_0$ to the beginning of each program.

Below the frame in which the index number IX "07" is recorded, there is provided a frame for the address data "5" that is "0101" in binary notation. The address bit data of this frame is identification data for judging whether or not the second TOC area 4 and the second lead-out area 6 of FIG. 11 are utilized. If data are recorded in the second TOC area 4, a frame corresponding to "B0" is provided in the index number IX.

In FIG. 11, the beginning point of the second TOC area 4 is located in the vicinity of a position A4 at which the 33 minutes:36 seconds:50 frames have elapsed since the time address $A_0$. Specifically, the position retrogressed one minute from A4 towards the inner rim represents the beginning point $A_3$ of the second TOC area 4. The beginning point $A_3$ of the second TOC area 4 can also be calculated from the start address $A_2$ of the first TOC area. The position corresponding to the first TOC start address $A_2$ summed to a fixed value of one minute:30 seconds represents the beginning point $A_3$ of the second TOC area 4.

With a conventional audio-reproducing optical disc, no absolute time for the first TOC area has been established. With the disc-shaped recording medium of the present invention, the frame for which the index number IX is "C0" is the absolute time specifying the beginning position of the first TOC area 1 of FIG. 11. That is, the value of 97 minutes:22 seconds:74 frames is recorded at the time address $A_r$. The end position of the first TOC area 1, that is the time address $A_0$ of FIG. 11, is provided at a position of 99 minutes:59 seconds:74 frames. The time address $A_0$ also specifies the absolute time of 0 minutes:0 seconds:0 frames.

The maximum play time for an ordinary compact disc is 74 minutes. The recording in the time addresses $A_0$ and $A_r$ exceeds 74 minutes with the present invention to provide discrimination from the usual compact disc by recording the time where no data is recorded. The domain from time address $A_r$ to time address $A_0$, that is the domain from the position of 97 minutes:22 seconds:74 frames to the position of 99 minutes:59 seconds:74 frames is provided on the inner rim side with respect to the time address $A_0$.

If the first TOC area 1 specifies that data has been recorded in the second TOC area 4, the optical disc for audio reproduction has a portion corresponding to the address bit data "6" or "0110" in binary notation. This portion specifies data recorded in the second TOC area 4. If data recorded in the second TOC area 4 are arrayed on a frame basis, since the data are all other than the audio data, the number "4", that is "0100" in binary notation, is used as control bit data for the control bit block 112 of the second TOC area 4 shown in FIG. 6.

A frame for which "1", or "0001" in binary notation is used as address bit data specifies that the time information concerning the second program area 5 and the second lead-out area is recorded therein, whereas a frame for which "6" or "0110" in binary notation is used as address bit data specifies that the program attribute information of the program of the first program area is recorded therein.

With reference to FIG. 13, the four frames having the address bit code of "1", after the absolute time components PMIN of the frame having the index number IX of "A0" and the frame having the index number IX of "A1" are both "8", the number of the program recorded in the second program area 5 is one, namely the eighth program as counted from the first program area 2.

Since the absolute time component PMIN, absolute time second component PSEC and the absolute time frame number PFRM of the frame having the index number IX of "A2" is "64:13:02", it is seen that the second lead-out area 6 begins at a position at which 64 minutes:13 seconds:2 frames has elapsed from the time address $A_0$. This position corresponds to the time address $A_6$ of FIG. 11.

Since the absolute time component PMIN, absolute time second component PSEC and the absolute time frame number PFRM of the frame having the index number IX of "08" is "33:38:50", it is seen that the second program area 5 begins at a position at which 33 minutes:38 seconds:50 frames has elapsed from the time address $A_0$. This position corresponds to the time address $A_5$ of FIG. 11. The above frame is the subcoding frame and 75 frames correspond to one second.

Referring to FIG. 11, the present optical disc for audio reproduction is an optical disc in which, with the time address $A_0$ as a point of origin, the time address $A_1$ is present at a position for which 2 seconds:0 frames have elapsed, the time address $A_2$ is present at a position for which 31 minutes:6 seconds:50 frames have elapsed, the time address $A_4$ is present at a position for which 33 minutes:36 seconds:50 frames have elapsed, the time address $A_5$ is present at a position for which 33 minutes:38 seconds:50 frames have elapsed, the time address $A_6$ is present at a position for which 64 minutes:13 seconds:2 frames have elapsed, the time address $A_7$ is present at a position for which 65 minutes:43 seconds:2 frames have elapsed and in which a domain from 97 minutes:22 seconds:74 frames to 99 minutes:59 seconds:74 frames is provided on the inner rim side with respect to the time address $A_0$, this 97 minutes:22 seconds:74 frame position is used as time address $A_r$ and an area from this position as far as the 99 minutes:59 seconds:74 frames, that is up to the time address $A_0$, is used as the first TOC area 1.

Since the second lead-out area 6 of 1 minutes:30 second is provided, the time address $A_7$ specifies the position of the 65 minutes:43 seconds:2 frame position, as explained previously.

Referring now to FIG. 14, if the address bit data is "6", the data bit block 114 of the channel Q is made up of a program number section 11, an attribute section 12 and seven character data sections 13. Each section has 8-bit data recorded therein.

The program number section 11 specifies the beginning frame and the terminal frame of the character string of the program attribute information. The character string is indicated by the character data section 13 of each frame recording the program attribute information.

The most significant bit (MSB) of the program number section 11 specifies that the frame is the frame of the last character string of the program attribute information. As for the remaining seven bits, "1" to "99" stand for numerical figures corresponding to the program numbers of the TOC area 1, while "0" and "100" to "126" stand for the classes of the attributes of the character strings as later explained. If the MSB is "1", "128" is summed to give a program number TR.

For example, the frame having the program number "01" in FIG. 13 specifies that the character strings formed by plural character data sections 13 represent the name of the first program of the first program area 2, and the program number of the last frame of the character string is represented by "129". If the character string is the data of up to seven character data sections 13, the program number of the character string is represented by only the frame whose pogrom number is the above- mentioned MSB.

For example, the frame with the program number "131" has less than seven characters of the character data, the track number of the frame having this data is not "03" but "131".

The program numbers of "0" and "100" to "126" define the classes of the attributes of the character strings for the respective program numbers, as shown in FIG. 15.

If the program number is "100", the character string of this frame specifies the disc name or disc title, so that "DISC Title" is displayed as shown in FIG. 13.

If "DISC Title" is displayed, a recording area for nine characters is required. Since only seven characters can be recorded in each frame, the frame in which the remaining two characters "le" is recorded is the frame having the program number "228", as shown in FIG. 13.

The reason the program number becomes "228" is that the program number is recorded in "100" for the "DISC Tit"

and, if there is a frame for linking, "1" is set for the eighth bit (i.e., 100+2=228), so that the program number of the frame to be linked next becomes 228".

In the frame of the program number "101", the disc identification number is indicated, as shown in FIG. 15. However, if a character string for displaying "DISCNo1234567" as the disc discrimination number, is recorded, as shown in FIG. 13, a recording area for 13 characters is required. Since only seven characters can be recorded in each frame, as shown in FIG. 13, the remaining six characters are recorded in a frame having a program number of "229".

In the frame having the program number "102", there is recorded a character string of displaying the genre of the audio recorded on this disc as "JAZZ". Since this character string has less than seven characters, the program number for the frame having this character string is not "102" but "230". That is, if the character string is less than seven characters long, only one frame is required for recording and hence there is no linking frame.

The attribute section 12 in FIG. 14 has the former 4 bits specifying character codes and the latter 4 bits representing character serial numbers. That is, in the index number IX (attribute number) of FIG. 14, the number represented by the first hexadecimal number is the data representing character codes, while the next hexadecimal number is the data representing the character serial number.

The data representing the character code specifies whether the data recorded in the character data section 13 of the frame having this data is the Japanese Industrial Standard (JIS) code or the American National Standard Code for Information International Interchange (ASCII) code. Sixteen sorts of the character codes can be specified by data specifying the character codes.

The data specifying the character serial number indicates which are the numbers of the frames in the data represented by the track numbers if the character string lies across plural frames. By the data specifying the serial number of the characters, extensions of up to the maximum of 16 frames, that is 112 characters, become possible for each character string.

In FIG. 13, there are two frames whose program number is represented by "100". The data of the attribute section 12 of the character string is "00". The frame with the program number "228", having the last character string, is the second frame, so that the data of the attribute section 12 is "01".

The character data section 13 of FIG. 14 has data for specifying the characters per character data section 13 by the character code specified by data representing the character codes of the attribute section 12.

In FIG. 13, the respective characters are represented by Roman alphabet characters or Arabic numerals for ease of understanding. Each frame has seven character data portions 13.

As in the case of the conventional audio optical disc, data recording is made in triplicate in the first TOC area, on the data basis, and the data thus recorded in triplicate are repeated. In the second TOC area, data recorded once is repeated on the data basis.

Figure 1:
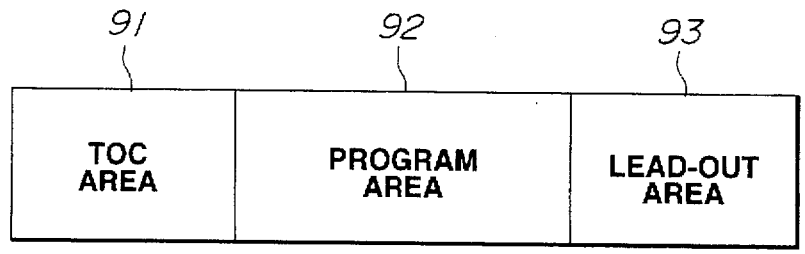
FIG. 1 illustrates a data area for recording on a data area of a conventional optical disc for audio reproduction.
Figure 4:
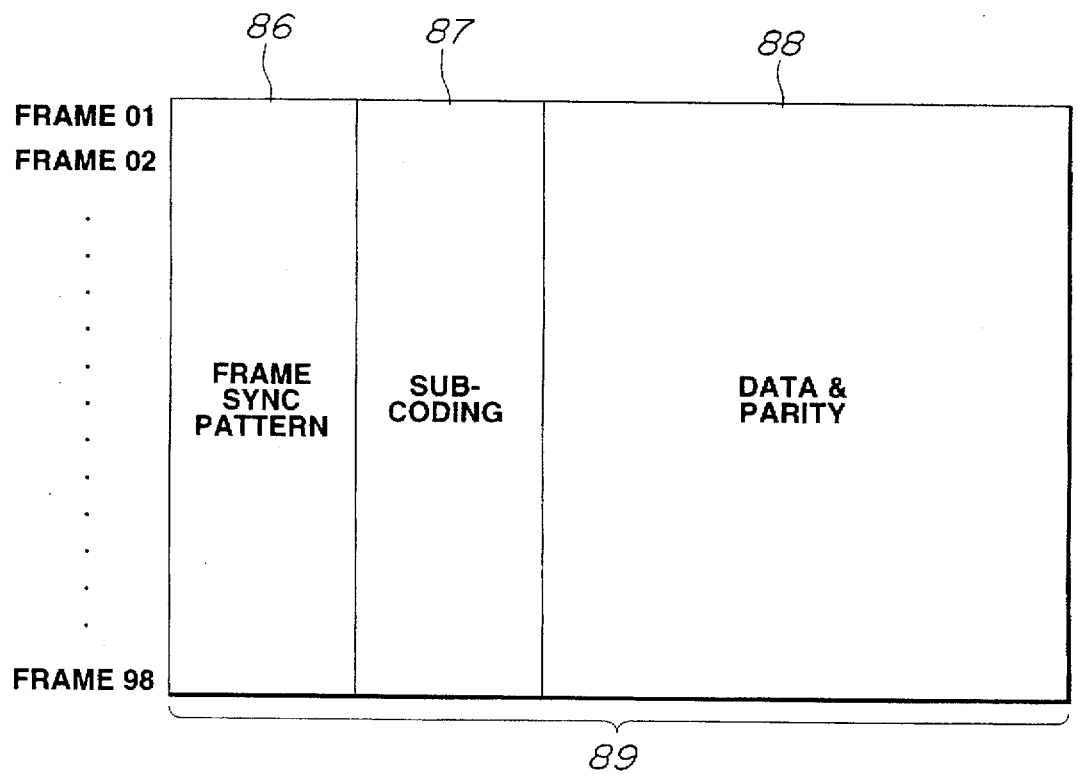
FIG. 4 illustrates a subcoding frame format having a layered structure of 98 of the frames shown in FIG. 3.
Figure 2:
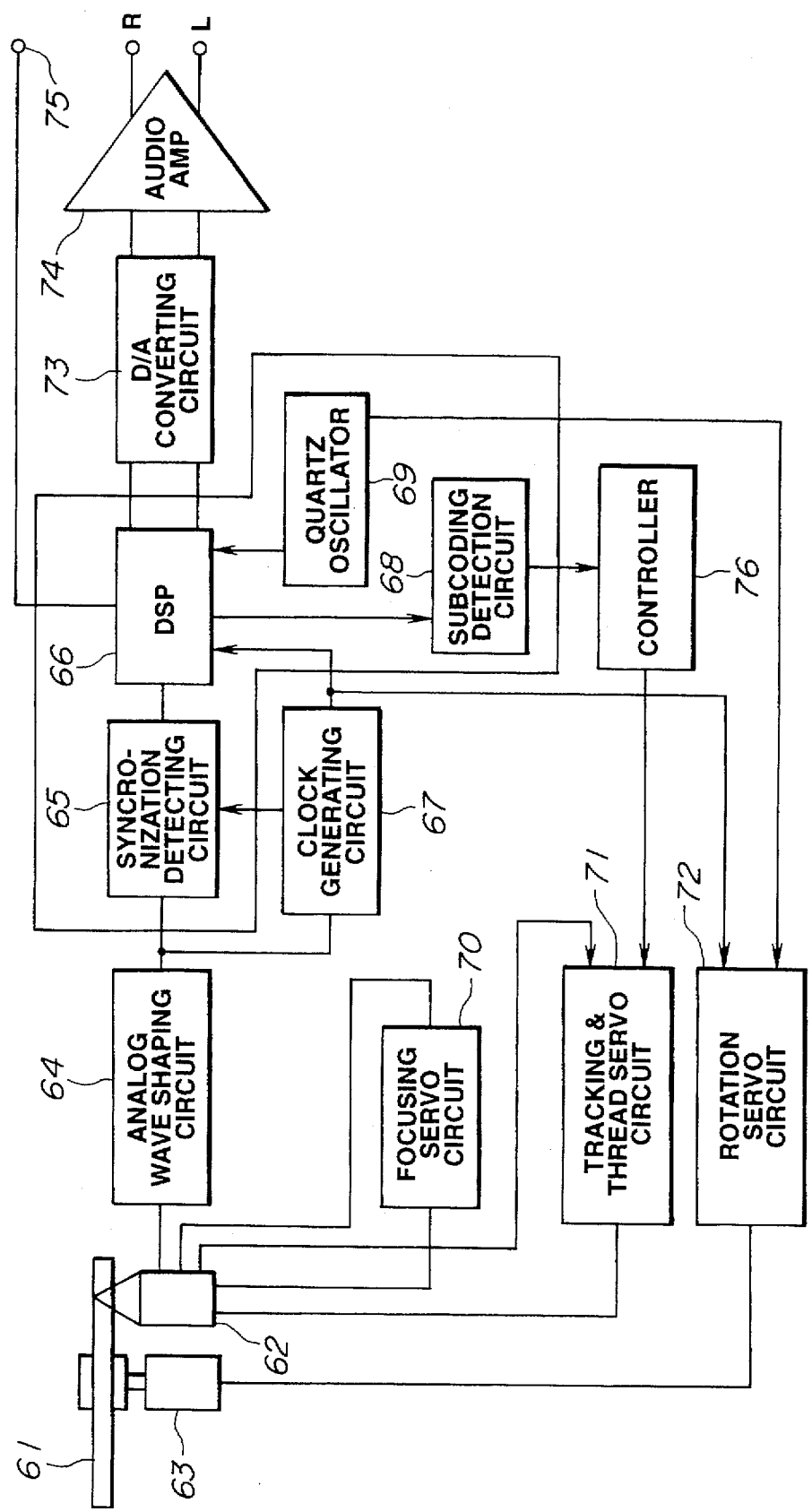
FIG. 2 is a block diagram showing essential portions of a conventional disc reproducing apparatus.
Figure 16:
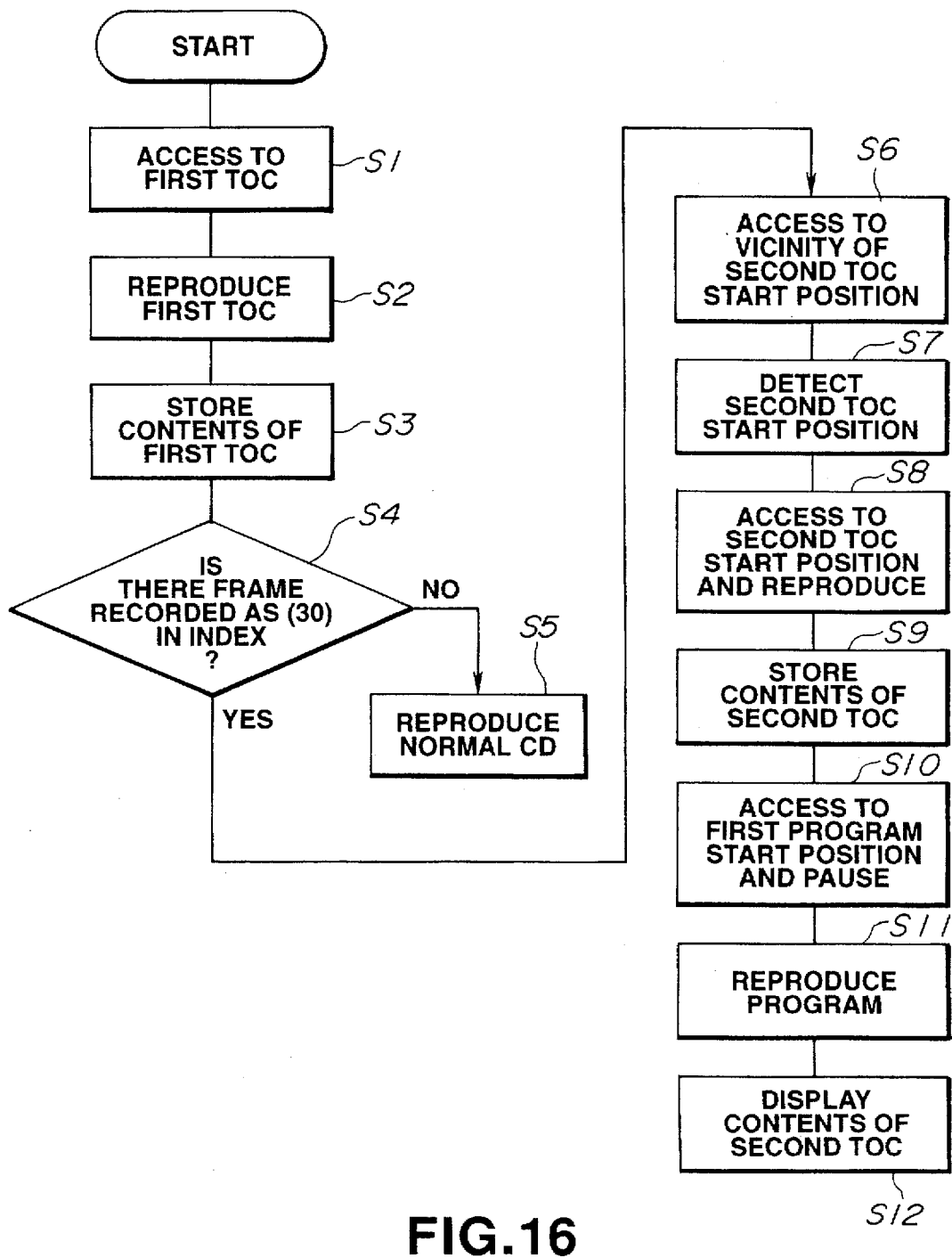
FIG. 16 is a flow chart for illustrating the operation of a disc reproducing apparatus according to the present invention.

Referring to FIG. 16, the disc reproducing method for reproducing the disc-shaped recording medium according to the present invention is started at step S1 where readout means for reading out signals on the disc, such as a pickup, accesses the first TOC area 1 of FIG. 2. The program then transfers to step S2.

At step S2, the first TOC area 1 is reproduced. The program then transfers to step S3 where the reproduced contents are stored in a first storage means (RAM 33, FIG. 17). The program then transfers to step S4.

At step S4, it is judged, based upon the reproduced contents of the first contents of the first TOC area 1, whether or not there is any frame in which data "B0" has been written in the index section 52 of FIG. 9. If the result of judgment is NO, that is if it is judged that there is no frame in whose index section 52 data "B0" is recorded, the program transfers to step S5 for reproducing the audio optical disc in the usual manner.

If the result of judgment at stelp S4 is YES, that is if it is judged that there is a frame in whose index section 52 data "B0" is recorded, the program judges that the second management area is present on the disc, and transfers to step S6. At step S6, the readout means accesses the time address 33:36:50, represented by data of the elapsed time minute component MIN, elapsed time second component SEC and the elapsed time frame number FRM of the frame in whose index section 52 data "B0" is recorded. See FIG. 12. The program then transfers to step S7.

This time address 33:36:50 corresponds to time address $A_4$ of FIG. 11. In the present embodiment, the time address $A_4$ is a time address for which one minute has elapsed from time address $A_3$. At step S7, a preset time, herein one minute, is subtracted from the time address $A_4$ of FIG. 11, thereby detecting time address $A_3$, that is the start position of the second TOC area 4.

The program then transfers to step S8 where the readout means accesses to the start position of the second TOC area 4 for reproducing the second TOC area 4.

The program then transfers to step S9. At step S9, the contents of the second TOC area 4 are stored in a second storage means (RAM 34, FIG. 17) different from the first storage means. The program then transfers to step S10.

At step S10, the readout means accesses the start position of the first program stored in the first program area 2 of FIG. 11, and enters a stand-by state for awaiting a command input. The program then transfers to step S11.

At step S11, the playback mode is entered so that the program of the first program area 2 starts to be reproduced. The program then transfers to step S12.

At step S12, the second management information inclusive of the program attribute information associated with the program being reproduced, that is the contents of the second TOC area 4 stored in the second storage means, are displayed on display means.

Figure 17:
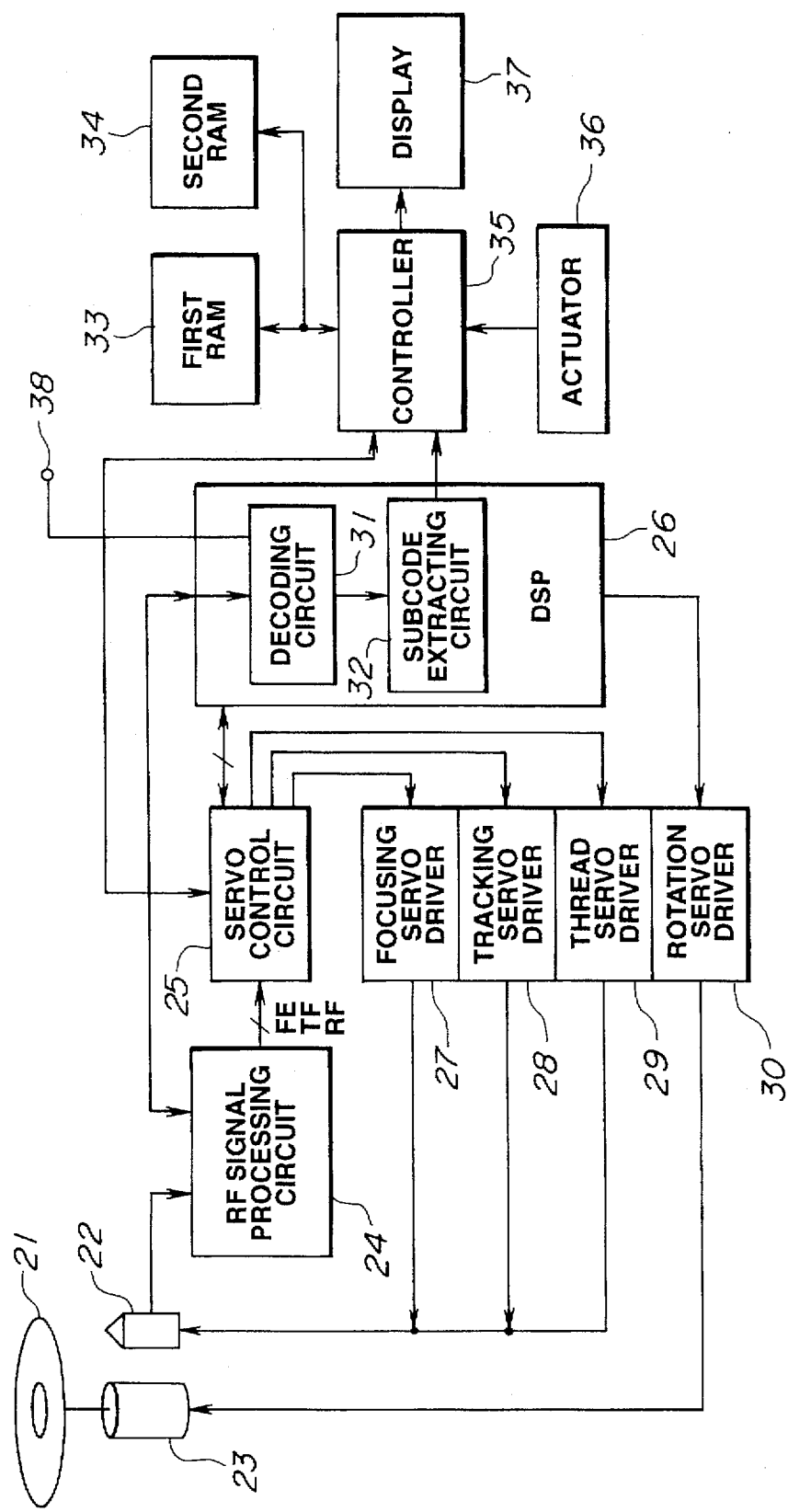
FIG. 17 is a schematic block diagram snowing essential portions of the disc reproducing apparatus according to the present invention.

FIG. 17 shows a disc reproducing apparatus for carrying out the above-described data reproducing method for reproducing the optical disc for which recording/formatting has been performed as described above.

The reproducing apparatus includes a pickup 22, as readout means, and a controller 35. The pickup 22 is configured for accessing the first TOC area 1 as the first management area of the audio optical disc shown in FIGS. 10 and 11 and the start position of the second TOC area 4 as the second management area for reading out the first management information recorded in the first management area and the second management information recorded in the second TOC area 4. The controller 35 detects the start position of the second TOC area 4, based upon the address information for specifying the second TOC area 4 in the first management area, read out by the pickup 22, and controls the readout operation of the second management information by the pickup 22 based upon the results of detection.

Referring to FIG. 17, an output of the pickup 22 is fed to the RF signal processing circuit 24. Output signals of the RF signal processing circuit 24 are sent to the servo control circuit 25 and to the digital signal processing circuit 26. Outputs of the servo control circuit 25 are sent to the digital signal processing circuit 26, the controller 35, a focusing servo driver 27, a tracking servo driver 28, a thread servo driver 29 and to a rotation servo driver 30. The outputs of the focusing servo driver 27, the tracking servo driver 28 and the thread servo driver 29 are sent to the pickup 22.

The output of the rotation servo driver 30 is sent to the spindle motor 23. An output of the digital signal processing circuit 26 is sent to the rotation servo driver 30.

Within the digital signal processing circuit 26, an output of a decoding circuit 31 is sent to an audio output terminal 38 and to a subcode extracting circuit 32, an output of which is sent to the controller 35.

An output of the controller 35 is sent to the servo control circuit 25, a first RAM 33, a second RAM 34 and to a display 37. The outputs of the first RAM 33, the second RAM 34 and an actuator 36 are sent to the controller 35.

The pickup 22 reads out signals recorded in the optical disc 21 and sends the read-out signals to the RF signal processing circuit 24. The operation of the pickup 22 reading out the areas shown in FIG. 11 is controlled depending upon outputs supplied from the focusing servo driver 27, the tracking servo driver 28 and the thread servo driver 29.

The RF signal processing circuit 24 wave-shapes the RF signals sent from the pickup 22 and converts them into bi-level signals, while detecting focusing error signals and tracking servo signals and sending these error signals to the servo control circuit 25. The RF signal processing circuit 24 also extracts data portions from the wave-shaped bi-level signals and sends the data portions to the digital signal processing circuit 26.

The servo control circuit 25 generates servo control signals, based upon the focusing servo error signals FE, tracking servo error signals and the thread servo error signals from the RF signal processing circuit 24, a first readout control signal from the digital signal processing circuit 26 and a second readout control signal from the controller 35, and sends the servo signals to the focusing servo driver 27, tracking servo driver 28 and to the thread servo driver 29 for controlling the readout operation of the pickup 22 by these servo drivers. The servo control signals are also sent to the controller 35.

The servo control circuit 25 also detects the clock components of the bi-level signals and sends the detected clocks to the digital signal processing circuit 26. The digital signal processing circuit 26 generates rotation servo control signals, based upon clocks from the servo control circuit 25 and reference clocks, and sends the rotation servo control signals to the rotation servo driver 30 for controlling rotation of the spindle motor 23 via the rotation servo driver 30.

The decoding circuit 31 decodes the data portions of the wave-shaped bi-level signals, modulated in accordance with the EFM, and sends the decoded data to the audio output terminal 38 and to the sub-code extracting circuit 32. The sub-code extracting circuit 32 detects sub-code data, that is the P- and Q-channel data, from the decoded data from the decoding circuit 31. These P- and Q-channel data are sent to the controller 35, while being converted into the first readout control signals so as to be sent to the servo control circuit 25.

The controller 35 takes out the time information recorded in the first TOC area 1 shown in FIG. 11, based upon the servo control signal from the servo control circuit 25 and upon the P- and Q-channel data from the sub-code detection circuit 32, and sends the time information to the first RAM 33. The controller 35 also takes out the second management information recorded in the second TOC area 4 and sends the information to the second RAM 34.

The operation of taking out the second management information is explained. The step numbers shown in FIG. 16 are depicted in brackets.

The pickup 22 accesses the TOC area 1 (step S1) and reproduces the first TOC area 1 (step S2). The controller 35 detects the Q-channel from the produced RF signals. The controller 35 takes out data specifying time addresses $A_r$, $A_1$, $A_2$, $A_4$ and $A_6$ of FIG. 11 and sends the data to the fist RAM 33 (step S3).

The controller 35 judges from the data whether there is the second TOC area 4 (step S4), and sends the second readout control signals to the servo control circuit 25 and causes the servo control signals to be outputted from the servo control circuit 25 in order for the pickup 22 to access the second time address $A_4$ of FIG. 2 (step 6).

The controller 35 also subtracts one minute from the time specifying the time address $A_4$ and detects the start position of the second TOC area 4, that is the time address $A_3$ of FIG. 11 (step S7).

The controller 35 also controls the operation of the pickup 22 by the above control method, in order for the pickup 22 to have access to the time address $A_3$ on the optical disc 21. The pickup 22 accesses the time address $A_3$ on the optical disc 21 for reproducing data from the second TOC area 4 (step S8).

The controller 35 detects the second management information recorded in the second TOC area 4, from the Q-channel data obtained by the sub-code extracting circuit 32, based upon the RF signals produced by the reproducing operation, and sends the detected information to the second RAM 34 (step S9).

The controller 35 also takes out necessary data from the first RAM 33 or the second RAM 34, responsive to a command input from the actuator 36, and sends the data thus taken out to the display 37.

The actuator 36 effects a command input of optionally selecting a desired data to be displayed from among the title of the optical disc 21, identification number, program name, player name, genre of the program, messages to the player or to the program, and the information on maximum, average, maximum frequency and minimum levels, in addition to the elapsed time of the program being played, and sends the command input to the controller 35. The display 37 displays the information, selected by the actuator 36, based upon the data transmitted from the controller 35.

In the above embodiment, the start position of the second TOC area 4 of FIG. 11, that is the time address $A_3$, is derived by subtracting one minute from an arbitrary position in the second TOC area 4, that is the time specifying the time address $A_4$.

This, however, is not limitative of the present invention. That is, the effects similar to those obtained as described above may be obtained by optionally changing the relative position between the time address $A_4$ and the time address $A_3$ and performing an arithmetic operation depending upon this relative position.

Although the time address $A_4$ is used in the above embodiment for detecting the time address $A_3$, this again is not limitative of the present invention and the effects similar to those described above may be obtained by employing e.g., the start position of the first lead-out area, the start position of the second program area or the start position of the second lead-out area, that is the time addresses $A_2$, $A_5$ or $A_6$, as the reference position.

What is claimed is:

1. A disc-shaped recording medium comprising:

a program area in which is recorded at least one program;

first management area in which are recorded an absolute address information of each program recorded in the program area and a first management information inclusive of the absolute address information of all of the programs recorded in the program area;

a second management area which is separate from the first management area and in which is recorded a second management information inclusive of an attribute information specifying the attributes of at least each program recorded in the program area;

wherein the first management area, the program area and the second management area are provided in this order looking from an inner rim towards an outer rim of the disc-shaped recording medium;

wherein an address information specifying the recording position of the second management area is recorded in the first management area; and wherein data recorded in the program area is audio data and wherein the attribute information managed by the second management area is at least one of the group of a title information of the disc-shaped recording medium, an information on the player, a program-based title information, an information on program sorts, an identification code number for identifying the disc-shaped recording medium, and a message information concerning the program.

2. The disc-shaped recording medium of claim 1, wherein the attribute information is recorded in the form of Q-channel sub-code information.

3. The disc-shaped recording medium of claim 1, wherein in the first management area Q-channel sub-code data are recorded, on a frame-by-frame basis, each frame including a different index number IX, represented in hexadecimal notation, for indexing the programs recorded in the program area and further wherein, as an indication that data are recorded in the second management area, an index number IX corresponding to "B0" is recorded for detection.

4. A disc-shaped recording medium comprising:

a program area in which is recorded at least one program;

a first management area in which are recorded an absolute address information of each program recorded in the program area and a first management information inclusive of the absolute address information of all of the programs recorded in the program area;

a second management area which is separate from the first management area and in which is recorded a second management information inclusive of an attribute information specifying the attributes of at least each program recorded in the program area; and wherein an address information specifying the recording position of the second management area is recorded in the first management area, wherein data recorded in the program area is audio data, and wherein the attribute information managed by the second management area is at least one of the group of a minimum sound pressure level, a maximum level, an average level and a maximum frequency level of the program.

5. A disc-shaped recording medium comprising:

a program area in which is recorded at least one program;

a first management area in which are recorded an absolute address information of each program recorded in the program area and a first management information inclusive of the absolute address information of all of the programs recorded in the program area;

a second management area which is separate from the first management area and in which is recorded a second management information inclusive of an attribute information specifying the attributes of at least each program recorded in the program area;

wherein the first management area, the program area and the second management area are provided in this order looking from an inner rim towards an outer rim of the disc-shaped recording medium;

wherein an address information specifying the recording position of the second management area is recorded in the first management area; and wherein data recorded in the program area is audio data and wherein the attribute information managed by the second management area is at least one of the group of a minimum level, a maximum level, an average level and a maximum frequency level of the program.

6. A disc-shaped recording medium comprising:

a program area in which is recorded at least one program;

a first management area in which are recorded an absolute address information of each program recorded in the program area and a first management information inclusive of the absolute address information of all of the programs recorded in the program area;

a second management area which is separate from the first management area and in which is recorded a second management information inclusive of an attribute information specifying the attributes of at least each program recorded in the program area, and wherein an address information specifying the recording position of the second management area is recorded in the first management area; and wherein in the first management area Q-channel sub-code data are recorded, on a frame-by-frame basis, each frame including a different index number IX, represented in hexadecimal notation, for indexing the programs recorded in the program area and further wherein, as an indication that data are recorded in the second management area, an index number IX corresponding to "B0" is recorded for detection.

* * * * *